US012651290B2

(12) United States Patent
Lefebvre et al.

(10) Patent No.: US 12,651,290 B2
(45) Date of Patent: Jun. 9, 2026

(54) SYSTEMS AND METHODS FOR COMPUTER-BASED ADDRESS VALIDATION AND CORRECTION

(71) Applicant: Shopify Inc., Ottawa (CA)

(72) Inventors: Roch Lefebvre, Gatineau (CA); Keith Wiersema, Chicago, IL (US); Diego Pires Plentz, Toronto (CA)

(73) Assignee: SHOPIFY INC., Ottawa (CA)

( * ) Notice: Subject to any disclaimer, the term of this patent is extended or adjusted under 35 U.S.C. 154(b) by 204 days.

(21) Appl. No.: 18/481,670

(22) Filed: Oct. 5, 2023

(65) Prior Publication Data

US 2025/0117843 A1 Apr. 10, 2025

(51) Int. Cl.
*G06F 16/00* (2019.01)
*G06Q 10/083* (2023.01)
*G06Q 30/0601* (2023.01)

(52) U.S. Cl.
CPC ....... *G06Q 30/0641* (2013.01); *G06Q 10/083* (2013.01)

(58) Field of Classification Search
CPC .. G06Q 30/0641; G06Q 10/083; G06F 16/29; G06F 40/174; G06F 40/205; G06F 16/2365; G06F 16/24578; G06V 30/424; B07C 7/005; Y10S 209/90
See application file for complete search history.

(56) References Cited

U.S. PATENT DOCUMENTS

| | | | | |
|---|---|---|---|---|
| 10,007,739 B1 * | 6/2018 | Gundersen | ........ | G06F 16/90344 |
| 10,122,659 B1 * | 11/2018 | Sumner | .............. | H04M 7/0045 |
| 10,904,185 B1 * | 1/2021 | Kawai | ..................... | H04L 51/48 |

(Continued)

FOREIGN PATENT DOCUMENTS

| | | | | | |
|---|---|---|---|---|---|
| CN | 104134145 A | * | 11/2014 | | |
| CN | 114077611 A | * | 2/2022 | ............. | G06F 16/29 |
| CN | 115330497 A | * | 11/2022 | ............. | G06F 16/29 |

OTHER PUBLICATIONS

Elastic Docs | Elasticsearch Guide [8.10] | Query DSL | Term-level queries. Fuzzy query. Published in 2023. Retrieved Jul. 27, 2023 from https://www.elastic.co/guide/en/elasticsearch/reference/current/query-dsl-fuzzy-query.html (3 pages).

*Primary Examiner* — Syed H Hasan

(57) ABSTRACT

For users to receive products that they purchased online, they may provide their delivery addresses to the e-commerce system. To minimize the number of incorrect delivery addresses processed by the e-commerce system, an address validation system may be used. However, technical challenges exist for such systems. A validation system which searches an address database for an exact match may be too strict and reject a user-provided address for insignificant reasons. Further, the validation system may not factor in aspects that are specific to postal address searching. In some embodiments, an intelligent address validation system may be implemented which performs an informed search that considers more than mere exact matches. Using the results of the informed search, the intelligent address validation system may perform further processing to choose a reference address, i.e., the address to which the user-provided address will finally be compared, for validation and correction suggestions purposes.

20 Claims, 10 Drawing Sheets

(56)  References Cited

U.S. PATENT DOCUMENTS

| | | | |
|---|---|---|---|
| 2005/0108625 A1* | 5/2005 | Bhogal | G06Q 10/10 |
| | | | 715/221 |
| 2006/0212356 A1* | 9/2006 | Lambert | G06Q 30/02 |
| | | | 705/16 |
| 2007/0162454 A1* | 7/2007 | D' Albora | G06Q 10/10 |
| 2008/0172270 A1* | 7/2008 | Eckenroth | G06Q 10/08 |
| | | | 705/333 |
| 2008/0291899 A1* | 11/2008 | Gromoll | G06Q 20/3255 |
| | | | 370/352 |
| 2010/0121864 A1* | 5/2010 | Stuhec | G06F 40/30 |
| | | | 707/758 |
| 2011/0270808 A1* | 11/2011 | Faruquie | G06F 40/247 |
| | | | 707/E17.046 |
| 2011/0307476 A1* | 12/2011 | Sharma | G06F 16/313 |
| | | | 707/723 |
| 2013/0185317 A1* | 7/2013 | Welton | G06F 40/205 |
| | | | 707/755 |
| 2013/0246261 A1* | 9/2013 | Purves | G06Q 20/36 |
| | | | 705/41 |
| 2015/0081485 A1* | 3/2015 | Angelovski | G06Q 40/12 |
| | | | 705/30 |
| 2021/0019700 A1* | 1/2021 | Lee | G06F 16/29 |
| 2021/0285790 A1* | 9/2021 | Rustogi | G01C 21/3811 |
| 2023/0350903 A1* | 11/2023 | Psaroudakis | G06N 3/08 |

* cited by examiner

400

500

┌─────────────────────────────────────────────────────────┐
│ Transmit web content corresponding to a page for placing an │
│ order, the web content including instructions for rendering │
│ address fields on the page for receiving an input address │
│ 502 │
└─────────────────────────────────────────────────────────┘
                              ↓
┌─────────────────────────────────────────────────────────┐
│ Receive the input address provided via the address fields, the │
│ input address containing a plurality of address components │
│ 504 │
└─────────────────────────────────────────────────────────┘
                              ↓
┌─────────────────────────────────────────────────────────┐
│ Compare the input address to a reference address in an │
│ address database to identify an address component of the │
│ input address that is different from a respective component of │
│ the reference address │
│ 506 │
└─────────────────────────────────────────────────────────┘
                              ↓
┌─────────────────────────────────────────────────────────┐
│ Transmit an instruction to display the respective component as │
│ an alternative to the address component │
│ 508 │
└─────────────────────────────────────────────────────────┘

FIG. 5

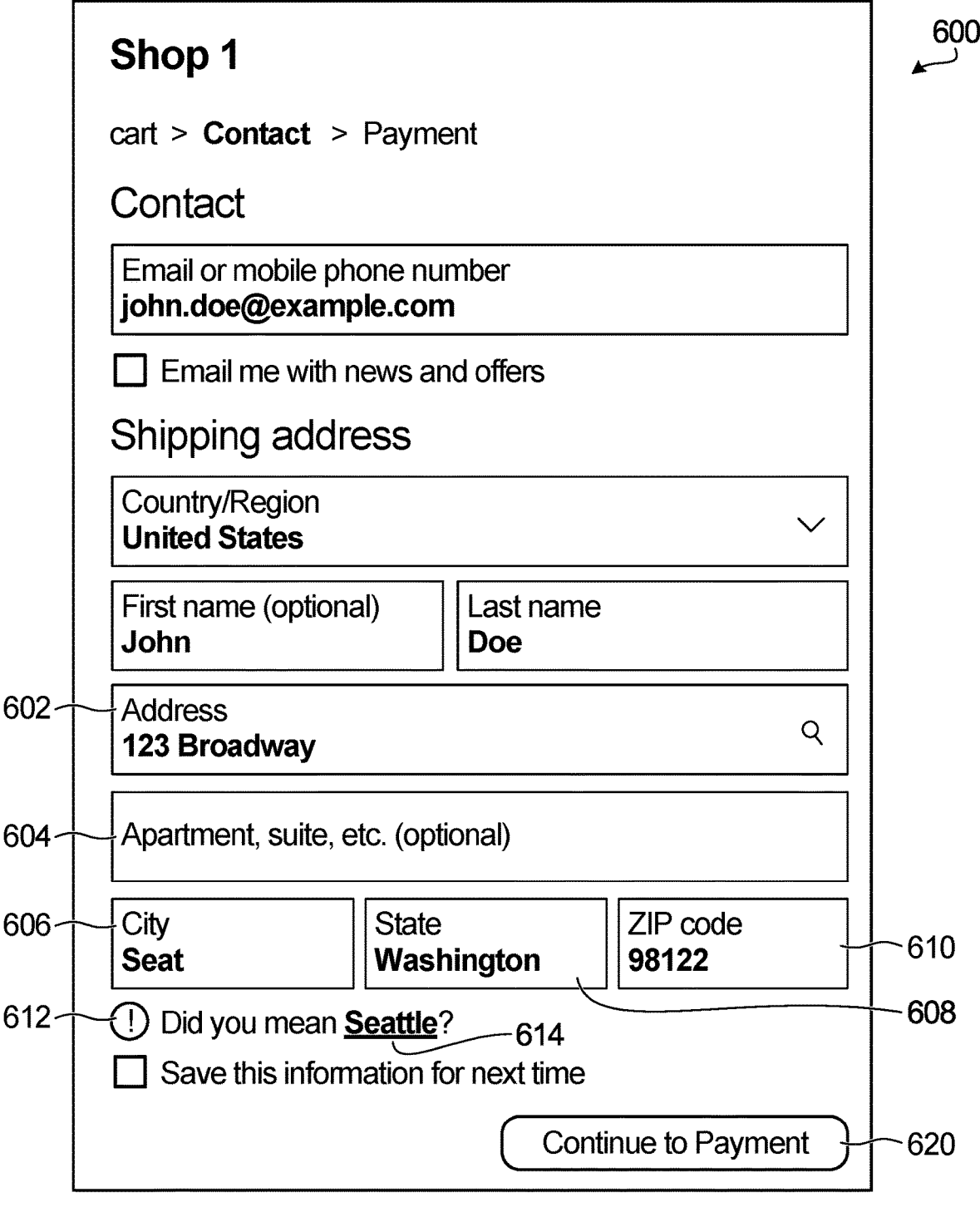

Shop 1 cart > Contact > Payment

Contact

Email or mobile phone number
john.doe@example.com

☐ Email me with news and offers

Shipping address

Country/Region
United States  ⌄

First name (optional)
John

Last name
Doe

Address
123 Broadway 🔍

Apartment, suite, etc. (optional)

City
Seat

State
Washington

ZIP code
98122

ⓘ Did you mean Seattle?

☐ Save this information for next time

Continue to Payment

FIG. 6

Example B

SYSTEMS AND METHODS FOR COMPUTER-BASED ADDRESS VALIDATION AND CORRECTION

FIELD

The present application relates to computer validation and correction of delivery addresses in e-commerce.

BACKGROUND

In an e-commerce system, a user can browse items that are physically located far away from the user. Upon purchase of a product, the product may be delivered to the user. In order for the product to be delivered, the user's preferred address for delivery ("delivery address") must be known by the e-commerce system. Often, a user is presented with a checkout page where a delivery address can be input by the user, including at least a street name, a city, a zip code, and additionally, a building number, a state or province, a suite number, and other relevant information, such as a buzzer code or particular delivery instructions.

At times, a user may provide an incorrect delivery address to a checkout page, for example, because of one or more typos or because of a discrepancy between what the user believes to be the delivery address and how the delivery address is stored in an address database (e.g., United States Postal Service (USPS) or Canada Post database). Letting incorrect addresses through may have consequences down the line. For example, they may result in scenarios where packages are undeliverable, or where shippers or carriers need to contact the buyer and correct the address, leading to increased costs and delays.

SUMMARY

An address validation system may be implemented by a computer in an attempt to catch incorrect delivery address information during checkout. However, various technical challenges arise with respect to implementing such a system.

First, the computer has the technical challenge that it cannot just compare the address provided by the user to all possible addresses in an address database and look for an exact match, because the result will be an address validation system that is too strict. It will deny any address which is not an exact match to an address stored in an address database. For example, a user-provided address including a suite number as "apt #202" may be rejected because a corresponding address stored in the address database defines the suite as "suite #202" instead. This may cause frustration for users interacting with the checkout page and result in less efficient machine-user interaction. In some cases, users may abandon the purchase altogether.

An address validation system may, upon determining that a user-provided address is deficient or erroneous in some way, present an alternative "corrected" address to the user which the user can accept or decline. For example, a user may provide the address "12 Broodway Drive, Manhattan, New York State, ZIP 10004". In this scenario, the user has misspelled "Broadway" as "Broodway". The address validation system may return the address "12 Broadway Drive, New York, New York State, ZIP 10004". It is apparent that the returned address replaces "Broodway" with "Broadway" and "Manhattan" with "New York".

The computer may present the "corrected" address to the user, e.g. via a modal window on a checkout page. The user may be unwilling to accept the "corrected" address as a whole because they do not agree that Manhattan should be replaced with New York. However, the user may be forced to accept, or decline and alter the inputted address, in order to proceed further with the purchase, e.g. in order to make the modal window to go away. The user may thus become frustrated at being unable to proceed further without either accepting the whole of a "corrected" address or manually altering their inputted address.

In some embodiments, the computer may implement an intelligent address validation system that provides address validation and correction for a user, and addresses the issues listed above.

Upon a user providing an address ("input address") to the intelligent address validation system (e.g., through a checkout page), the system may first leverage a search and analytics engine (the "engine") to compare the input address to an address database containing millions of addresses and return a certain number of candidate addresses. The candidate addresses may be chosen by determining which addresses in the address database have the greatest number of components in common with the input address.

A search which merely looks for exact matches for the components in the input address may not be effective, since mistakes (e.g., typos) may have been made by the user, and/or different words may be used to effectively refer to the same concept (e.g., "St.", "St", "Street"). The engine may thus perform a more informed search, such that a component of an address which is deemed to be a close, although not an exact, match to a component in the input address is still considered to be a component "in common". To perform the informed search, the engine may look at various factors such as edit distance, acronyms (e.g., NY vs New York), synonyms (e.g. Boston versus Dorchester), abbreviations (e.g. street versus st.), etc. One or more of these factors may be associated with an inherent capability of the engine, while others of these factors may be configured.

The candidate addresses determined by the engine may be ranked so that there is a top candidate address. However, in such an implementation there exists a further technical challenge for the computer in that the top candidate address as identified by the engine may not be trustworthy. For example, due to its general matching nature, the engine may not factor in certain aspects that are relevant for and specific to postal address searching. The engine may be unable to recognize the importance of aspects such as an order of words in a multi-word street name. Therefore, although the engine may be configured to take into account certain factors, such as known synonyms, known acronyms, known abbreviations, accents, etc., to perform an informed search for candidate addresses, due to the engine's core and inherent characteristics, the system may need to perform further processing in order to ensure that of the candidate addresses, the best one is chosen to be the reference address, i.e., the address to which the input address will finally be compared, for validation and correction suggestions purposes.

Therefore, once the engine provides the candidate addresses, the intelligent address validation system may initiate a process to determine the reference address from the candidate addresses. The reference address may or may not be the same as the top candidate address as identified by the engine. In other words, a re-ranking may be performed to find the reference address. In some embodiments, the reference address may differ from the input address, and the intelligent address validation system may provide suggestions to the user to alter the input address to align with the reference address, as described hereinafter. Once the reference address is determined, further processes may be initiated by the system to determine whether suggestions to alter any component of the input address need be displayed to the user. Any suggestions that are displayed may be those that would result in a meaningful change to the input address. In some embodiments, the page is modified to display the component of the reference address that is the suggested alternative to the input address component that the system is suggesting to replace. For example, the component of the reference address may be displayed adjacent to the address field containing the input address component. This may allow the user to select replacement of just that address component, rather than having to select replacement of the whole address, which provides for improved user-machine interaction.

In one embodiment, there is provided a computer-implemented method. The method may include a step of transmitting, to a user device, web content corresponding to a page for placing an order. The web content may include instructions for rendering address fields on the page for receiving an input address. The method may further include a step of receiving, from the user device, the input address that was provided via the address fields of the page. The input address may contain a plurality of address components, and each one of the address components may be provided via a respective address field of the page. The method may further include a step of comparing the input address to a reference address in an address database to identify an address component of the input address that is different from a respective component of the reference address in the address database. The method may further include a step of transmitting, to the user device, an instruction to display the respective component of the reference address as an alternative to the address component of the input address.

In some embodiments, the instruction to display the respective component of the reference address as an alternative to the address component of the input address may include an instruction to display the respective component adjacent to an address field containing the address component of the input address. In some embodiments, the respective component of the reference address in the address database may be instructed to be displayed as a selectable user interface element.

In some embodiments, the method may further include a step of receiving an input selecting the selectable user interface element. Responsive to receiving the input, the method may further include a step of causing modification of the page to remove the display of the respective component of the reference address adjacent to the address field, and replace the address component that is different from the respective address component with the respective address component in the address field.

In some embodiments, the method may further include a step of receiving an input selecting a different user interface element different from the selectable user interface element. The input may define an operation related to a request to proceed with the order. Responsive to receiving the input, the method may further include a step of causing the order to proceed even if the selectable user interface element is not selected.

In some embodiments, the method may further include a step of receiving an input selecting a different user interface element different from the selectable user interface element. The input may define an operation related to a request to proceed with the order. Responsive to receiving the input, the method may further include a causing modification of the page to display an error message, thereby not allowing the placing of the order to proceed if the selectable user interface element is not selected.

In some embodiments, responsive to receiving the input address that was provided via the address fields of the page, the method may further include a step of selecting a plurality of candidate addresses from all addresses in the address database. Each of the plurality of candidate addresses may include one or more address components deemed to be equivalent to respective one or more of the plurality of address components of the input address. Each of the plurality of candidate addresses may be determined to include a greater number of address components deemed to be equivalent to the plurality of address components of the input address than other addresses in the address database.

In some embodiments, each of the plurality of candidate addresses may be divisible into a respective set of address portions. The address portions may each consist of one or more address components. The method may further include a step of determining, from the plurality of candidate addresses, the reference address. Determining the reference address may include a step of comparing, for each of the plurality of candidate addresses, each address portion to a respective address portion of the input address to determine if the address portion and the respective address portion match. Determining the reference address may further include a step of designating, as the reference address, one of the plurality of candidate addresses including the greatest number of address portions determined to match respective portions of the input address.

In some embodiments, comparing each address portion to the respective address portion of the input address to determine if the address portion and the respective address portion match may include determining whether the address portion is equivalent to the respective address portion. The portion and the respective portion may be determined to match if the address portion is equivalent to the respective address portion.

In some embodiments, responsive to determining that there is a subset of the plurality of candidate addresses that each include the greatest number of address portions determined to match respective address portions of the input address, the method may further include a step of comparing each candidate address of the subset as a whole to the input address as a whole to determine a matching degree. The method may further include a step of designating, as the reference address, the candidate address of the subset having the highest matching degree.

In some embodiments, comparing each candidate address of the subset as a whole to the input address as a whole to determine a matching degree may include at least one of: determining a degree to which an order of words in each candidate address of the subset is the same as a corresponding order of words in the input address; determining a number of unmatching words between each candidate address of the subset and the input address; determining an aggregate edit distance between each candidate address of the subset and the input address; or determining a number of prefix relationships between each candidate address of the subset and the input address. The candidate address of the subset having the highest matching degree may include at least one of: a highest degree to which the order of words in the candidate address is the same as a corresponding order of words in the input address; a lowest number of unmatching words between the candidate address and the input address; a lowest aggregate edit distance; or a highest number of words of prefix relationships between the candidate address and the input address.

A system is also disclosed that is configured to perform the methods disclosed herein. For example, the system may include at least one processor to directly perform (or instruct the system to perform) the method steps.

In another embodiment, there is provided a computer readable medium having stored thereon computer-executable instructions that, when executed by a computer, cause the computer to perform operations of the methods disclosed herein. The computer readable medium may be non-transitory.

BRIEF DESCRIPTION OF THE DRAWINGS

Embodiments will be described, by way of example only, with reference to the accompanying figures wherein:

FIG. 5 illustrates a computer-implemented method, according to some embodiments;

FIG. 6 illustrates a checkout page having a user's delivery address filled in fields, the checkout page showing a correction suggestion for the delivery address, according to some embodiments;

DETAILED DESCRIPTION

For illustrative purposes, specific embodiments will now be explained in greater detail below in conjunction with the figures.

An Example e-Commerce Platform

Although integration with a commerce platform is not required, in some embodiments, the methods disclosed herein may be performed on or in association with a commerce platform such as an e-commerce platform. Therefore, an example of a commerce platform will be described.

Figure 1:
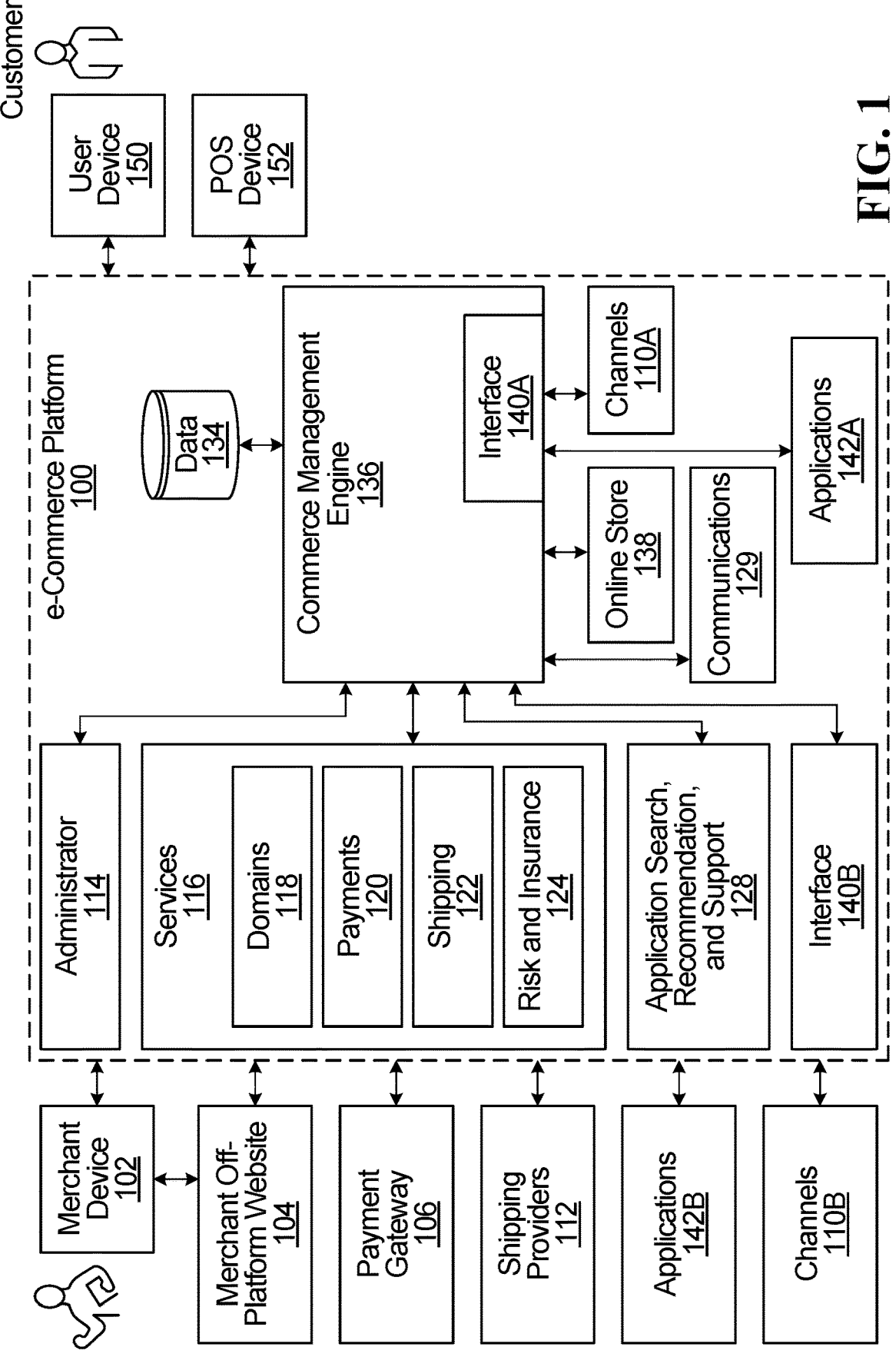
FIG. 1 is a block diagram of an e-commerce platform, according to some embodiments.

FIG. 1 illustrates an example e-commerce platform 100, according to some embodiments. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 1, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc., In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (Saas), infrastructure as a service (IaaS), platform as a service (PaaS), desktop as a service (DaaS), managed software as a service (MSaaS), mobile backend as a service (MbaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 2:
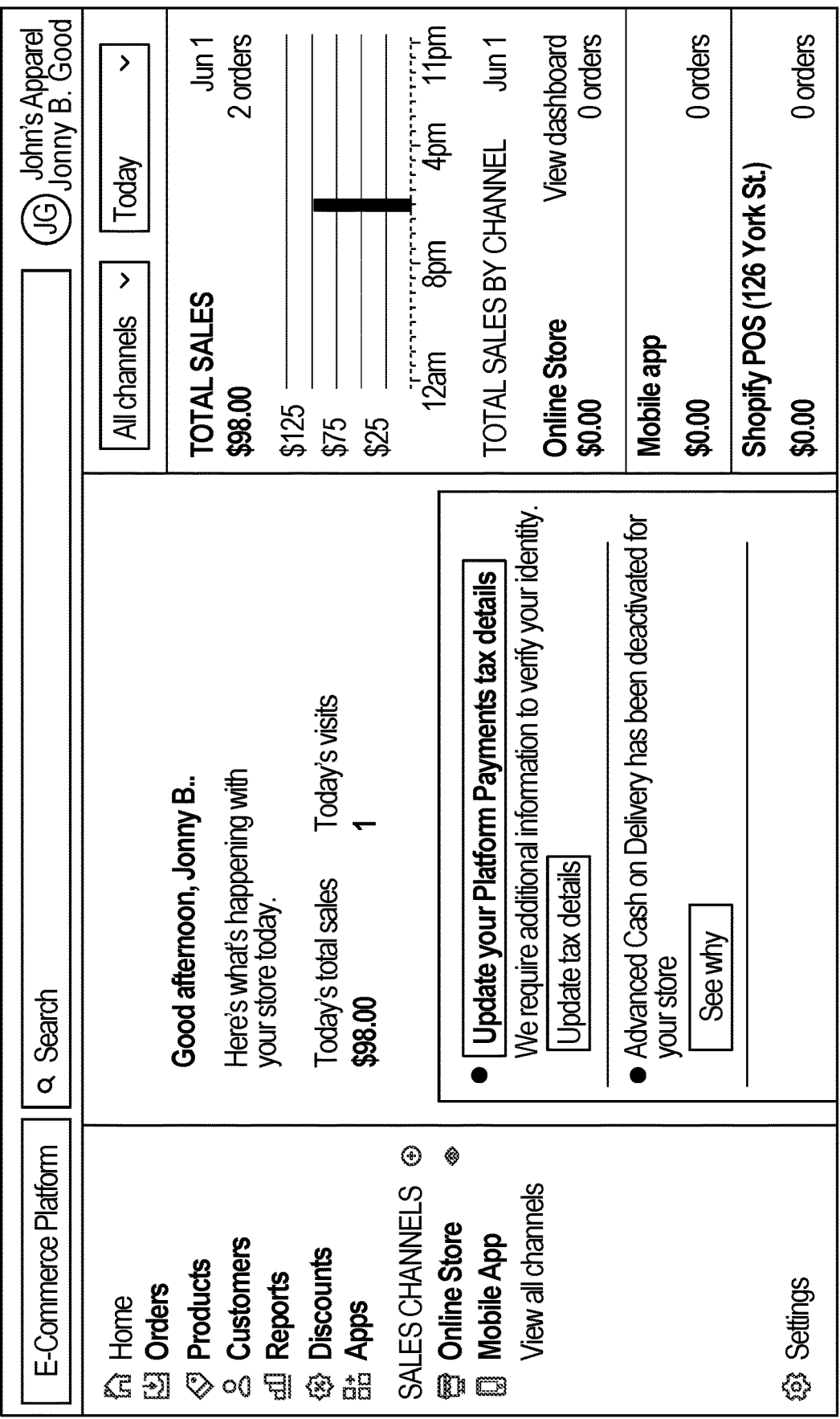
FIG. 2 illustrates an example of a home page of an administrator, according to some embodiments.

FIG. 2 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 2. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as. For example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 1, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as, for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (Representational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback uniform resource locator (URL). The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real time or near real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In some embodiments, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B. A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant.

Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and may track quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Figure 3:
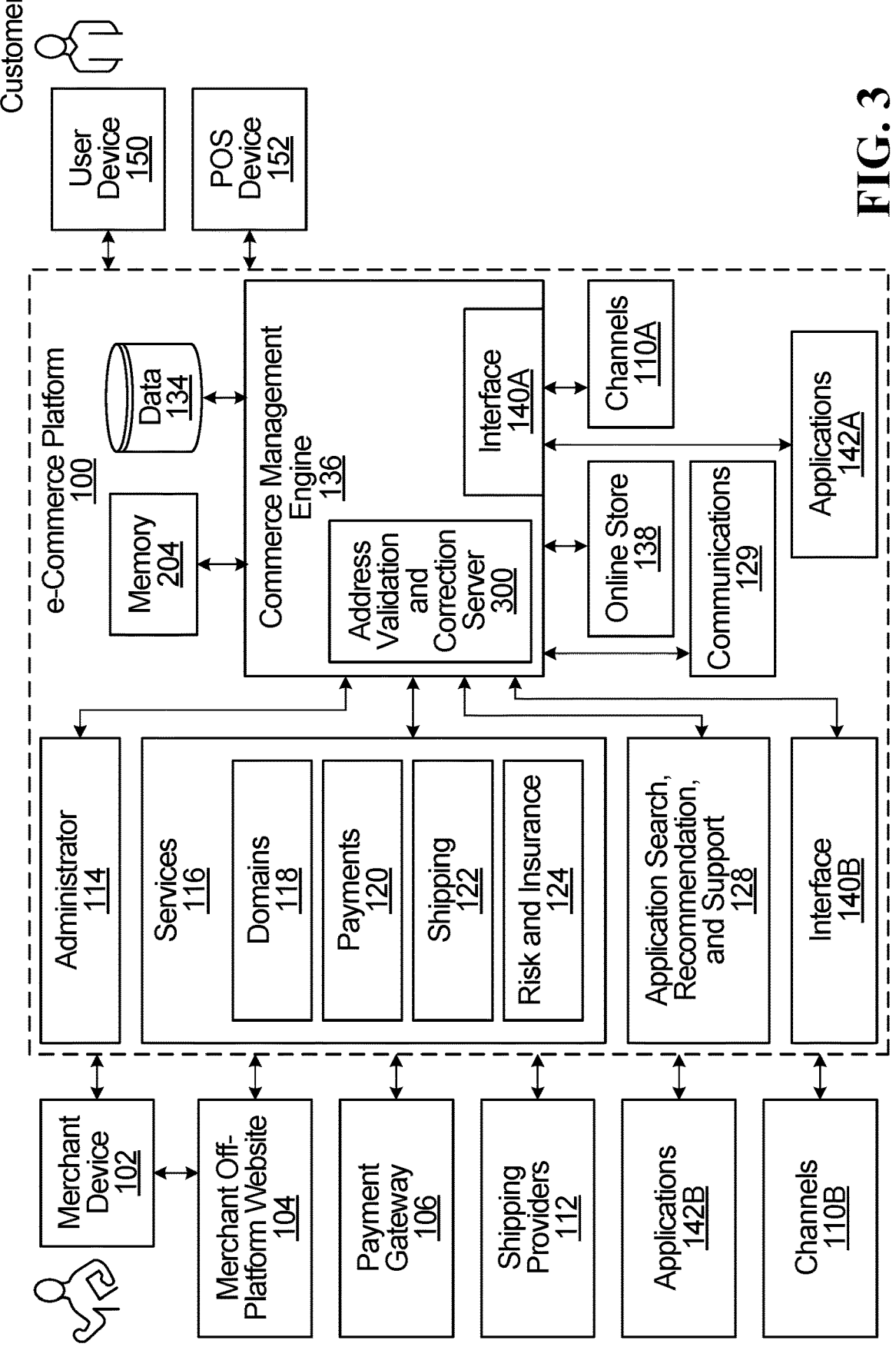
FIG. 3 illustrates the e-commerce platform of FIG. 1, but including an address validation server.

FIG. 3 illustrates the e-commerce platform 100 of FIG. 1, but with the additions of an address validation and correction server 300 and a memory 204. The address validation and correction server 300 may be embodied as part of the commerce management engine 136. The address validation and correction server 300 performs the address validation and correction methods disclosed herein, such as receiving a delivery address provided via fields of a checkout page, determining, using an address database, a reference address, validating the delivery address using the reference address, and/or providing suggestions for correcting the delivery address depending on the results of the validation. The address validation and correction server 300 may be implemented by one or more general-purpose processors that execute instructions stored in a memory (e.g. in memory 204) or stored in another computer-readable medium. The instructions, when executed, may cause the address validation and correction server 300 to perform the operations of the address validation and correction server 300, e.g., operations relating to the generation of correction suggestions to be displayed in association with a delivery address inputted by a user for a product purchased by the user from a merchant's online store 138. Alternatively, some or all of the address validation and correction server 300 may be located inside the e-commerce platform 100 but external to, and coupled to, the commerce management engine 136. In some embodiments, the address validation and correction server 300 may instead be located externally to the e-commerce platform 100 and possibly coupled to the commerce management engine 136.

Although the address validation and correction server 300 in FIG. 3 is illustrated as a distinct component of the e-commerce platform 100 in commerce management engine 136, this is only an example. The address validation and correction server 300 could also or instead be provided by another component residing within or external to the e-commerce platform 100. In some embodiments, either or both of the applications 142A-B may provide an address validation and correction server 300 that implements the functionality described herein. The location of the address validation and correction server 300 is implementation specific. In some implementations, the address validation and correction server 300 is provided at least in part by an e-commerce platform, either as a core function of the e-commerce platform or as an application or service supported by or communicating with the e-commerce platform. In some embodiments, at least a portion of the address validation and correction server 300 may be implemented in a user device (e.g. merchant device 102 and/or customer device 150). For example, the customer device 150 might store and run at least some of the address validation and correction server 300 locally as a software application.

Although the embodiments described herein may be implemented using the address validation and correction server 300 in e-commerce platform 100, the embodiments are not limited to the specific e-commerce platform 100 of FIGS. 1 to 3 and could be used in connection with any e-commerce platform. Also, the embodiments described herein need not necessarily be implemented in association with an e-commerce platform, although e-commerce platform, as used herein, has a broad meaning and includes online marketplaces and standalone online stores. To encompass all possibilities, the embodiments below will be described more generally.

Example System for Validating and Correcting a Delivery Address

Figure 4:
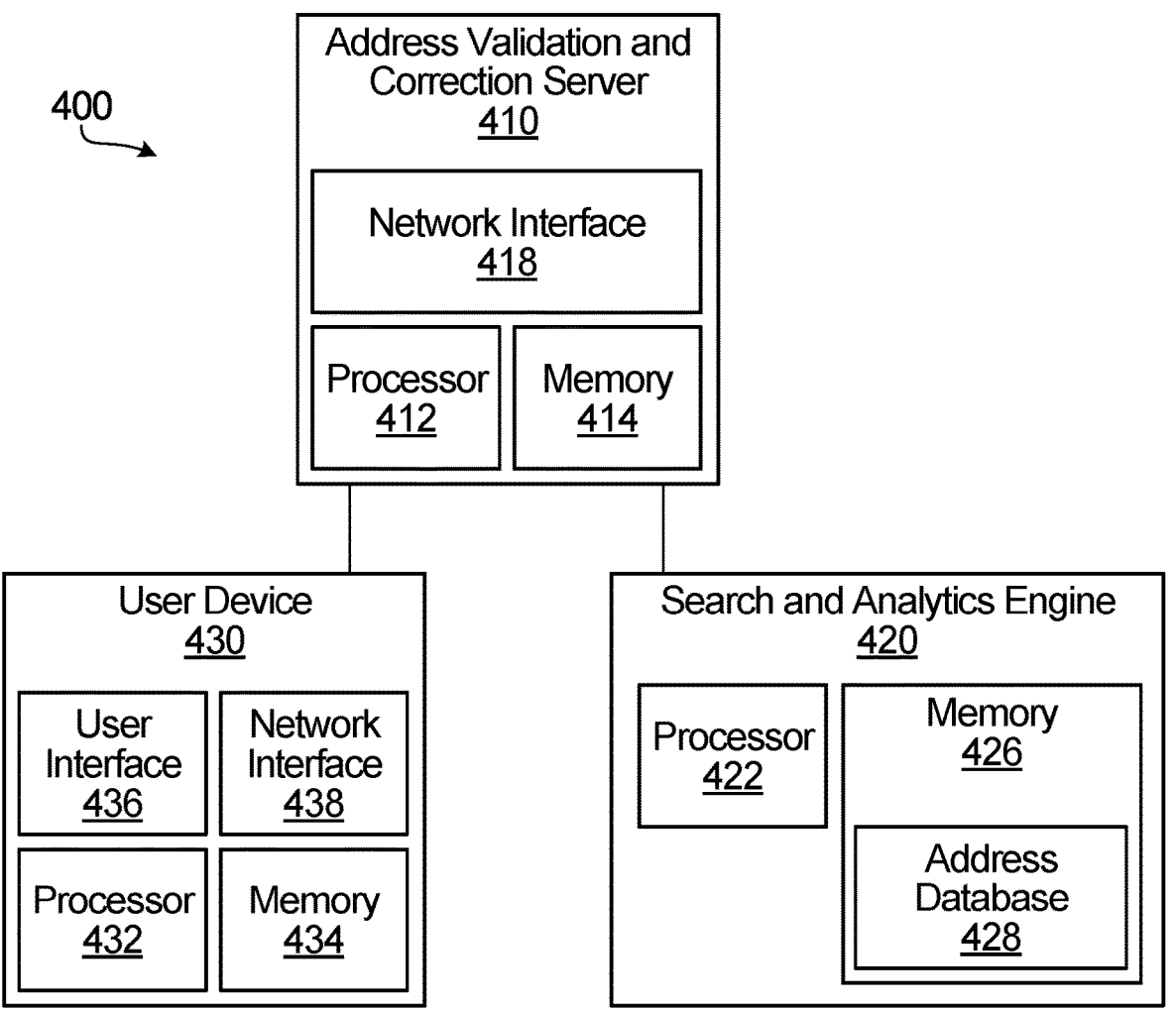
FIG. 4 is a block diagram illustrating an example system for validating and correcting a delivery address of a product purchased online, according to some embodiments.

FIG. 4 is a block diagram illustrating an example system 400 for validating and correcting a delivery address associated with a product sold by a merchant and purchased by a user, according to some embodiments. The system 400 includes an address validation and correction server 410 (the "server 410"), a search and analytics engine 420 (the "engine 420"), and a user device 430.

The address validation and correction server 410 may be part of an e-commerce platform, such as e-commerce platform 100. As illustrated, the server 410 includes a processor 412, memory 414, and a network interface 418.

The processor 412 directly performs, or instructs the server 410 to perform, the operations described herein as being performed by the server 410, such as receiving a delivery address provided via fields of a checkout page, validating the delivery address, and/or depending on the results of the validation, providing correction suggestions with respect to the delivery address for display on a user interface of a user device such as user device 430. The processor 412 may be implemented by one or more general purpose processors that execute instructions stored in a memory (e.g. in memory 414) or stored in another computer-readable medium. The instructions, when executed, cause the processor 412 to directly perform, or instruct the address validation and correction server 410 to perform the operations described herein. Alternatively, the processor 412 may be implemented using dedicated circuitry, such as a programmed FPGA, a GPU, or an ASIC.

The memory 414 may store instructions and data used or generated by the address validation and correction server 410. For example, the memory 414 may store software instructions or modules configured to implement some or all of the functionality and/or embodiments described herein and that are executed by the processor 412. As well, the memory 414 may include web content which may be transmitted over a network for display on a user device such as user device 430. The web content included in memory 414 may include web content transmitted to a user device, such as an online store product page or an online checkout page. A single memory 414 is shown in FIG. 4, but in implementation the memory 414 may be distributed.

The network interface 418 is provided for communicating over a network, e.g. to communicate with user device 430. The network interface 418 may be implemented as a network interface card (NIC), and/or a computer port (e.g. a physical outlet to which a plug or cable connects), and/or a network socket, etc., depending upon the implementation.

In some embodiments, the processor 412, memory 414, and/or network interface 418 may be located outside of the address validation and correction server 410.

A network (not shown) may be a computer network implementing wired and/or wireless connections between different devices, including the address validation and correction server 410 and the user device 430. The network may implement any communication protocol known in the art. Non-limiting examples include a local area network (LAN), a wireless LAN, an internet protocol (IP) network, and a cellular network.

The user device 430 includes a processor 432, a memory 434, a user interface 436, and a network interface 438. Although only one user device 430 is illustrated in FIG. 4 for ease of explanation, a plurality of user devices may communicate with the address validation and correction server 410 over the network.

The processor 432 of user device 430 directly performs or instructs all of the operations performed by the user device 430. Examples of these operations include sending a request for web content relating to a checkout page for a product sold on an e-commerce platform, and receiving a reply which includes the requested web content, which is then displayed via the user interface 436 of the user device 430. The page of web content may be a webpage (e.g. displayed using a browser) or a screen page of an application (e.g. a screen page of a native or web application on the user device). The processor 432 may be implemented by one or more processors that execute instructions stored in the memory 434 or in another computer readable medium. Alternatively, some or all of the processor 432 may be implemented using dedicated circuitry, such as an ASIC, a GPU, or a programmed FPGA.

The network interface 438 is provided for communicating over the network. The structure of the network interface 438 will depend on how user device 430 interfaces with the network. For example, if the user device 430 is a wireless device such as a mobile phone, headset or tablet, then the network interface 438 may include a transmitter/receiver with an antenna to send and receive wireless transmissions to/from the network. If the user device is a personal computer connected to the network with a network cable, then the network interface 438 may include, for example, a NIC, a computer port, and/or a network socket. The user interface 436 may be implemented as a display screen (which may be a touch screen), and/or a keyboard, and/or a mouse, etc., depending upon the implementation.

The user interface 436 may present virtual content to a user, including visual, haptic, and audio content. The user interface 436 may include means for a user to interact with the user device 430. For example, user interface 436 may include touch-sensitive element, such as a touch screen, associated with a touch screen display of user device 430, a button provided on user device 430, a keyboard and/or a mouse. The user interface 436 may also include a gesture recognition system, a speaker, headphones, a microphone, and/or haptics.

The search and analytics engine 420 includes a processor 422 and a memory 426, the memory 426 including an address database 428. The processor 422 directly performs or instructs all of the operations performed by the engine 420. The processor 422 may be implemented by one or more processors that execute instructions stored in the memory 426 or in another computer readable medium. Alternatively, some or all of the processor 422 may be implemented using dedicated circuitry, such as an ASIC, a GPU, or a programmed FPGA.

The search and analytics engine 420 may communicate with the address validation and correction server 410. Upon a request from the server 410, the engine 420 may send data to the server 410, at least a part of the data to be stored in memory 414 of the server 410. For example, the engine 420 may send address data to the server 410. The address data may include a plurality of addresses stored in the address database 428, as described in detail further below. The address database 428 may store addresses from one or more address databases such as the USPS or Canada Post database. As illustrated in FIG. 4, the engine 420 may be external to the server 410. The engine 420 may further include a network interface (not illustrated) so that the engine 420 may communicate with the server 410 through the network described above, although this is not necessary. Alternatively, the engine 420 may instead be internal to the server 410.

FIG. 5 illustrates a computer-implemented method 500, according to some embodiments. The steps of method 500 are described as being performed by the processor 412 of the address validation and correction server 410 of FIG. 4, but this is only an example. At least a portion or all of the method 500 may instead be performed elsewhere, such as at another processor separate from the address validation and correction server 410, or at the user device 430.

At step 502, processor 412 may transmit, to a user device, web content corresponding to a page for placing an order. The web content may include instructions for rendering address fields on the page for receiving an input address. The user device may be user device 430, which may communicate with the address validation and correction server 410 via a network. The processor 412 may transmit the web content in response to a request by the user device 430. For example, a user of the user device 430 may request web content, e.g., using a HTTP or HTTPS request, stored in the memory 414 of the server 410. The request may be sent through network interface 438 of user device 430 and received at network interface 418 of the server 410. In response, the processor 412 may transmit the requested web content to the user device 430. Alternatively, the web content may be provided to the user device 430 by another server, e.g. that hosts the web content.

FIG. 6 illustrates an embodiment in which the processor 412, in response to a request by the user device 430, has transmitted web content corresponding to a checkout page 600. The checkout page 600 may be requested by a user of the user device 430 so that an order can be placed for one or more products sold on an e-commerce platform. The transmitted web content may include instructions for rendering address fields on the page for receiving an input address. As shown, the checkout page 600 includes a plurality of address fields for receiving an input address of the user. The input address may be a user's preferred delivery address to receive the one or more products, and therefore may be used interchangeably with "delivery address". The delivery address may interchangeably be called a "shipping address".

The plurality of address fields include a first address field 602, a second address field 604, a city address field 606, a state (or province) address field 608, and a zip (or postal) code address field 610, in addition to a country or region address field and name fields. The first address field 602 may prompt the user to enter a building number, a street name, and a street type of the user's delivery address. The city address field 606, state address field 608, and zip code address field 610, may prompt the user to enter the city, state, and zip code, of the user's delivery address, respectively. The second address field 604 may prompt the user to enter any other pertinent information related to the user's delivery address, such as a suite number, unit type, buzzer code, delivery instructions, etc. The user may enter their delivery address via the address fields using the user interface 436 of the user device 430.

In addition to the address fields, checkout page 600 may also include fields for receiving other information associated with the user, such as an email or mobile phone number, as well as a selectable user interface element 620 (the "element 620"). Some of the fields for receiving other information may require information to be entered for the order to be able to proceed further. Others of these fields, such as a "first name" field, may not require information to be entered for the order to proceed further. The element 620 may be selectable by the user to further proceed with the order. For example, a user selecting the element 620 (using user interface 436 on the user device 430) may cause the processor 412 to transmit web content corresponding to a different page to the user device 430. The different page may prompt the user to enter payment information for purchasing the one or more products, or may communicate to the user that the order has been successfully placed.

There may be several situations where selecting the element 620 does not result in the order proceeding further and displaying the different page on the user device 430. Instead, when a user selects the element 620, an error message may be displayed on the checkout page 600, indicating that the order cannot proceed further. One such situation may be one in which the user has not entered any information for one or more of the first address field 602, the city address field 606, the state address field 608, and the zip code address field 610 (together, the "required address fields"). Another situation in which this may occur may be when there is a significant error in the information entered by the user in one or more of the required address fields 602, 606, 608, 610, which will be described in more detail further below.

At times, a user may provide an incorrect delivery address to a checkout page, such as checkout page 600. For example, in some cases, the user may make typos or other errors when entering the delivery address. In some cases, there may be a discrepancy between what the user believes to their delivery address, and how the address is stored in an address database like the USPS or Canada Post database. Since letting incorrect addresses through may have consequences, including delays or failures in delivering purchased products to users, an address validation system may be implemented in an attempt to catch incorrect delivery address information. However, such a system may face various technical challenges. The computer may have a first technical challenge that merely comparing the address provided to addresses in an address database to look for an exact match may result in a system that is too strict. It will deny any address which is not an exact match to an address in the address database. This may cause frustration for users and result in less efficient machine-user interaction.

Returning to FIG. 5, at step 504, the processor 412 may receive, from the user device, the input address. The input address may contain a plurality of address components. Each address component may be one element of an input address, such as a building number, street (including a street name and a street type), a city, a state, a zip code, a country, etc. Each one of the address components may be provided via a respective address field of the page. For example, FIG. 6 shows that the user has filled the address fields 602, 606, 608, 610, with various address components of their desired delivery address. For example, the first address field 602 has been filled in by the user with the terms "123 Broadway". Thus, the first address field 602 may include two address components, with one component denoting the building number, and the other component denoting the street name.

At step 506, the processor 412 may compare the input address to a reference address in an address database to identify an address component of the input address that is different from a respective component of the reference address in the address database 428. The reference address may be an address stored in an address database, such as the USPS or Canada Post database. The address database 428 may contain millions of addresses. The reference address may be an address that is determined by the processor 412 as being the most accurate delivery address in view of the information provided in the address fields 602, 606, 608, 610. Comparing the input address to the reference address may be done to determine how the user-inputted address differs from this most accurate delivery address. In some cases, there may be no difference, meaning that the input address entered by the user on a checkout page via the plurality of address fields matches the reference address exactly. In other cases, there may be one or more differences between the input address and the reference address.

Determining the reference address may generally involve the processes described below.

Once the user has entered in the information in at least the required address fields 602, 606, 608, 610, the address validation and correction server 410 may send a request to the search and analytics engine 420. In some embodiments, the request may be an application programming interface (API) request. The request may provide instructions for the engine 420 to perform a search, given the input address, to identify a number of candidate addresses. In one embodiment, this number may be 10, but this is not a requirement, and the number may alternatively be greater than or less than 10 (although at a minimum, the number may be greater than one). The example of 10 candidate addresses will be used going forward, simply for ease of explanation. The 10 candidate addresses may be a subset of the addresses stored in the address database 428 of the engine 420, and may be those viewed by the engine 420 as being closest to the input address.

The search and analytics engine 420 may be an engine which can search and analyze large volumes of data near or in real time, which is important in the context of web navigation in which there needs to be a small amount of time between when the user enters the address and when any suggested correction to the input address is transmitted for display on the page. In some embodiments, the engine 420 may be an off-the-shelf or third-party product suited for real-time or near real-time operations, such as Elasticsearch™, OpenSearch™, or Apache Solr™. Upon receiving the request from the address validation and correction server 410, the engine 420 may perform a search through the address database 428 to identify the 10 candidate addresses. The performed search may be a "fuzzy" search, a technique which allows the engine 420 to find addresses that are similar but not exactly the same as the input address, as opposed to finding only addresses that are an exact match to the input address. This may therefore be a technique which can take into account various typos or other errors that are made by a user when entering the input address.

The fuzzy search may be based on edit distance, which is a measurement of the number of single-character edits required to change one string to another. The edit distance may be set by the system 400, or the engine 420 may automatically adjust the fuzziness based on the length of the search term. For example, an edit distance of "1" may mean that for a search term of "lae", the engine 420 may deem terms that are a single edit distance from "lae" as being a match, such as "lane" or "lay".

In some embodiments, the processor 422 of engine 420 may perform the search on a component-by-component basis. The 10 candidate addresses may be those determined by the engine 420 as having the greatest number of components that match or are equivalent to respective components of the input address.

In some embodiments, the address validation and correction server 410 may perform pre-processing for the free-form fields, e.g., the first and second address fields 602, 604, which may include more than one component. For example, the first address field 602 may often be filled in by a user to include a building number, and a street. The second address field 604 may often be filled in include an apartment or suite number, a buzzer code, or other information pertinent to the delivery address. The pre-processing may involve parsing the user-entered information in the first and second address fields 602, 604, to identify components that are relevant for the search to be done by the engine 420. For example, the pre-processing may eliminate information the server 410 views as irrelevant (e.g., buzzer code information or delivery instructions), while retaining relevant components (e.g., building number, street, suite number, etc.) for the search request to the engine 420. To perform the pre-processing, the server 410 may be configured to generally know, upon parsing the information in the first and second address fields 602, 604, which elements of the information are relevant for the fuzzy search. For example, the server 410 may be aware that for a set of alphabetical words or tokens included in the first address field 602 ending in a word such "Street", "Avenue", "Drive", "Lane", "Crescent", "Road", etc., the words preceding correspond to a street address component. The server 410 may also be aware that for an address field such as the second address field 604, an apartment or suite number may be relevant for the search, whereas a buzzer code or delivery instructions (e.g., "Please do not ring the doorbell and call me instead.") may not be relevant. Therefore, the server 410 may include only relevant components of the input address in its request to the engine 420 to perform the fuzzy search. A relevant component may be one that the engine 420 can use in performing the search. For example, if the engine 420 does not include, in the memory 426, usable unit types or numbers, the server 410 may remove unit type or number information from the input address as irrelevant during the preprocessing.

In performing the search, the engine 420 may first perform tokenization (e.g. to separate the input into tokens) to enable the fuzzy search to be done on a component-by-component basis, as will be appreciated by those skilled in the art. One or more tokens may correspond to one address component. In some embodiments, the pre-processing described in the paragraph above (being performed by server 410) might instead be performed by the engine 420, e.g. before or as part of the tokenization.

In cases where the engine 420 is an off-the-shelf or third-party product, in a default state the fuzzy search may only consider edit distance. This may at times, skew the results of the engine 420. For example, in a first address field like the first address field 602, a user may include an input of "St Louis Way" in lieu of spelling out the full name, "Saint Louis Way". If the engine 420 only considers edit distance, an address in the address database 428 having "Saint Louis Way" may be overlooked in favor of an address having "Stu Louis Way" when identifying the 10 candidate addresses, since the term "Stu" has a smaller edit distance than "Saint". Therefore, the engine 420 may be configured to also take into account certain abbreviations, acronyms and synonyms known to the system 400, as part of its fuzzy search. For example, "St" and "St." may be known abbreviations for "Street" or "Saint". "NY" may be a known acronym for "New York". "Dorchester" may be a known synonym for "Boston", as Dorchester is a neighborhood located in the city of Boston. A user who lives in the Dorchester neighborhood, may accordingly enter "Dorchester" in a city address field, instead of Boston. Although the edit distance between "Dorchester" and "Boston" may be significant, the engine 420 may deem a city component of "Boston" in an address in the address database 428 as matching a component "Dorchester" entered by a user in a city address field. The engine 420 may be further configured to take into account other factors, such as accents. For example, the addresses in the address database 428 may be standardized to have no accented characters, even if a proper way of spelling an address may involve accents (e.g., é, è, ë, â, ã, etc.). Therefore, the engine 420 may be configured to consider any accented character as if it were its unaccented counterpart.

With the engine 420 configured to consider various additional concepts, including abbreviations, acronyms, synonyms, and accents, the fuzzy search may be performed by the engine 420. When performing the fuzzy search, the engine 420 may assign each address in the address database 428 a score. For example, as the engine 420 performs the search on a component-by-component basis, each component may be assigned a score based on how closely the component matches a respective component of the input address. With the engine 420 configured with knowledge about acronyms, abbreviations, synonyms, accents, etc., a component which is not an exact match with a respective component may still receive a perfect score if it is, for example, a synonym of the respective component. This may prevent the results of the fuzzy search from being skewed due to a lack of consideration for synonyms, accents, and the like. Therefore, despite having an edit distance greater than zero, a component of "St Louis Way" may be given as high a score as if the user had fully spelled out "Saint Louis Way", a component of "Dorchester" may be given as high a score as if the user entered "Boston", and a component of "Montréal" may be given as high a score as if the user entered "Montreal" without the accent. In this way, a user-entered component may be viewed as "matching" or "equivalent to" a respective component of an address in the address database 428, even if they are not an exact match (i.e., the exact same word(s) with the exact same spelling) to each other. Therefore, "match", as used herein, means exact match (i.e., the exact same word(s) with the exact same spelling) or equivalent (e.g. an acronym, abbreviation, or synonym).

A final score for an address may be the added value of the scores of all its address components. The fuzzy search may return the 10 candidate addresses identified as having the greatest number of components that match respective components of the input address, i.e., the 10 candidate addresses with the highest scores. The engine 420 may rank the 10 candidate addresses from highest to lowest score. From the perspective of the engine 420, therefore, the candidate address with the highest score (the "top candidate address") may be viewed as being the most accurate address given the input address entered by the user.

However, it may be problematic for the system 400 to simply accept the top candidate address as the reference address. For example, due to its general matching nature, the engine 420 may not factor in certain aspects that are relevant for and specific to postal address searching, despite being configured to consider additional concepts as discussed above. The matching nature of the engine 420 may be useful or a requirement for real-time or near real-time performance, which is important in the context of web navigation because there needs to be a small amount of time between when the user enters the input address and when any suggested correction to the input address is transmitted for display on the page. Moreover, the matching nature of the engine 420 may be useful in that it can be adapted to other searching tasks besides searching postal addresses. However, the limitation of such an engine 420 is that it does not factor in certain aspects that are relevant for and specific to postal address searching.

For example, the engine 420 may be unable to recognize that the order of words in a multi-word term may be important for postal addresses. Consider a scenario in which a user has entered, "8 Meadow View Ln" into a first address field, like the first address field 602, of a checkout page. The street address component is "Meadow View Ln". In performing the fuzzy search, the engine 420 may give a first address having a respective component of "Meadow View Lane", the same score as a second address having a respective component of "View Meadow Lane". In other words, even though the words of the respective component of the second address are in a different order than the user-entered component, it may be given the same score (i.e., a perfect score) as the respective component of the first address, since the order of the words may be irrelevant to a search and analytics engine like the engine 420. Depending on the score of the other components of the first address and the second address, there may be instances in which the second address has a higher total score than the first address. However, "Meadow View Lane" and "View Meadow Lane" may refer to different streets in wholly different locations. Despite this, the way the engine 420 scores and ranks candidate addresses may lead to a scenario where the second address is chosen as the top candidate address, or at least rank higher than the first address.

As another example, the engine 420 may be unable to recognize the relevancy of extra words included in an address that are unaccounted for in the input address. Consider a scenario in which a user has entered, "200 Lincoln Drive" into a first address field, like the first address field 602, of a checkout page. The street address component is "Lincoln Drive". In performing the fuzzy search, the engine 420 may give a first address having a respective component of "Albert Lincoln Senior Drive", the same score as a second address having a respective component of "Lincoln Drive". Even though the respective component of the first address has extra words as compared to the user-entered component, it may be given the same score as the respective component of the second address, since all of the words of the user-entered street address component are determined to match words of the respective component of the first address. However, "Albert Lincoln Senior Drive" and "Lincoln Drive" may refer to different streets in wholly different locations. Despite this, there may be scenarios where the first address is chosen as the top candidate address, or at least rank higher than the first address.

For at least the reasons discussed above, the address determined to be the top candidate address by the engine 420 may not be trustworthy, and it may be undesirable for the system 400 to automatically designate the top candidate address as the reference address. Therefore, once the engine 420 determines the 10 candidate addresses and returns the candidate addresses to the address validation and correction server 410, the server 410 may perform further processing to identify the reference address. In some cases, the reference address as determined by the server 410 may be the top candidate address as determined by the engine 420. In other cases, the reference address may not be the top candidate address and instead be one of the other nine candidate addresses.

Identifying the reference address from the 10 candidate addresses may generally involve the following processes.

The 10 candidate addresses determined by the engine 420 may be sent to the address validation and correction server 410 and stored in the memory 414 of the server 410. The server 410 may send another request (e.g., an API request) to the engine 420 with instructions to return the results of its tokenization process, and also to provide equivalent representations of the token as well. The engine 420 may therefore return the tokens, as well as synonyms, acronyms, abbreviations, and unaccented versions of any of the tokens. In this way, the server 410 may leverage the tokenization process and the equivalency knowledge used by the engine 420 to perform the fuzzy search, in its process of identifying the reference address.

The server 410 may perform a maximizing field match process with respect to the 10 candidate addresses. The input address may be entered using the plurality of address fields on a checkout page like checkout page 600. The information entered in each of the address fields may be called a field, or a portion, of the input address. A "portion" of the input address may be distinguishable from a "component" of the input address, in that one portion of the input address may include one or more components, just as one address field, such as the first address field 602, may be filled in with one or more components. The maximizing field match process may be performed to identify which one of the candidate addresses has the greatest number of matching respective fields or portions to portions of the input address.

For each of the candidate addresses, the maximizing field match process may involve comparing each portion of the input address to a respective portion of the candidate address to determine if the portion and the respective portion match. An exact match (same word(s) with the same spelling) may of course be considered a match. However, the server 410 may also take into account the abbreviations, acronyms, synonyms, and unaccented versions. Therefore, "8 Meadow View Ln" may be determined to match or be equivalent to "8 Meadow View Lane", and "Dorchester" may be determined to match or be equivalent to "Boston". The result of the maximizing field match process may yield one candidate address, out of the 10 candidate addresses, with the greatest number of matching respective portions to portions of the input address. In the maximizing field match process, the server 410 may prioritize or give preference to any candidate address where a street portion (corresponding to first address field 602), a city portion (corresponding to city address field 606), and a zip code portion (corresponding to zip code field 610) all match. For example, the maximizing field match process may result in two or more candidate addresses which have an equal number of respective portions that match portions of the input address. Of the two or more candidate addresses, there may only be one candidate address where the street portion, the city portion, and the zip code portion all match respective portions of the input address. The other(s) may include, for example, a matching city portion, a matching state portion (corresponding to state field 608) and a matching zip code portion, but not a matching street portion. Therefore, the one candidate address with matching street, city, and zip code portions may thus be identified as the candidate address having the greatest number of matching respective fields or portions to portions of the input address. Accordingly, this one candidate address may be designated as the reference address.

In some embodiments, the maximizing field match process may yield two or more candidate addresses which have an equal number of portions that match respective portions of the input address, and of those, an equal number of portions that match the street portion, the city portion, and the zip code portion of the input address. Each of these two or more candidate addresses may be referred to as an equal candidate address (collectively, the equal candidate addresses). For example, the maximizing field match process may yield two equal candidate addresses, each determined to have an equal number of portions which match respective portions of the input address. With respect to the first equal candidate address, the street portion, the state portion, and the zip portion may be determined to match respective portions of the input address, while the city portion is determined to not match the respective city portion of the input address. With respect to the second equal candidate address, the city portion, the state portion, and the zip code portion may be determined to match respective portions of the input address, while the street portion is determined to not match the respective street portion of the input address. In such embodiments, further processing may be done to identify the reference address from the two or more candidate addresses.

In some embodiments, the further processing may include an aggregate comparison process. To perform the aggregate comparison process, the server 410 may merge all of the portions of the input address together to form one input address string. The server 410 may also, for each of the two or more equal candidate addresses, merge all of the portions to create one address string for each of the two or more equal candidate addresses. Therefore, the aggregate comparison process may involve comparing each of the two or more equal candidate addresses as a whole, to the input address as a whole, as opposed to on a field-by-field (or portion-by-portion) basis.

The aggregate comparison process may include one or more of the following steps or subprocesses: determining the degree to which an order of words in each equal candidate address string is the same as a corresponding order of words in the input address string; determining the number of unmatching words between each equal candidate address string and the input address string; determining the aggregate edit distance between each equal candidate address string and the input address string; and/or determining whether any word in each equal candidate address string of the subset is a prefix of a corresponding word in the input address string, or vice versa. Using one or more of the subprocesses, the server 410 may determine a matching degree for each of the equal candidate addresses. Of the two or more equal candidate addresses, the candidate address determined to have the highest matching degree may be designated as the reference address.

Determining a degree to which an order of words in an equal candidate address string is the same as a corresponding order of words in the input address string may involve determining how many words of an equal candidate address string follows the order of words of the input address string. Consider one of the examples described above, where an input address includes "Meadow View Ln". Consider that a first equal candidate address includes "Meadow View Lane, while a second equal candidate address includes "View Meadow Lane". Ignoring the other portions of each string for sake of simplification (e.g., the city portion, state portion, and zip code portion), the number of words in the first equal candidate address which match the order of words in the input address string may be determined to be "three". By contrast, the number of words in the second equal candidate address which match the order of words in the input address string may be determined to be "one". Therefore, the first equal candidate address string may be determined to have a higher matching degree to the input address string than the second equal candidate address string, at least with respect to the order of words.

Determining a number of unmatching words between each equal candidate address string and the input address string may involve determining how many words each equal candidate address string "leaves on the table" with regard to the input address string. Consider one of the examples described above, where an input address includes "Lincoln Drive". Consider that a first equal candidate address includes "Albert Lincoln Senior Drive", while a second equal candidate address includes "Lincoln Drive". To determine a number of unmatching words, the server 410 may attempt to match each of the words or tokens of the input address string with a corresponding word or token of the first equal candidate address string, and conversely, match each of the words or tokens of the first equal candidate address string with a corresponding word or token of the input address string. A token may be determined to as not matching another token if the quotient of the edit distance between the two tokens divided by the total token length is greater than a configurable threshold. For example, ignoring the other portions of each string for sake of simplification, the server 410 may find that in comparing the input address string with the first equal candidate address string, there are two unmatched words between the input address string and the first equal candidate address string. Specifically, the server 410 may find that the words "Albert" and "Senior" of the first equal candidate address string cannot be matched to any word in the input address string. In other words, for each of these two words, the quotient of the edit distance between the respective word and each token in the input address, divided by the total token length, may be greater than a threshold percentage. When the server 410 compares the input address string with the second equal candidate address string, the server 410 may find that there are no unmatched words, since all of the words of the input address string are accounted for in the second equal candidate address string, and all of the words of the second equal candidate address string are accounted for in the input address string. Therefore, the first equal candidate address string may be determined to have a higher matching degree to the input address string than the second equal candidate address string, at least with respect to the number of unmatching words.

Determining the aggregate edit distance between each equal candidate address string and the input address string may involve determining how many single-character changes are needed to turn the input address string into a respective equal candidate address string. In some embodiments, the server 410 may first remove those words between the input address string and a respective equal candidate address string that are a match, from consideration. Then, an aggregate edit distance may be determined between the words that are left, i.e., the unmatched words. Consider an example where an input address string includes "North Broodway Street". The user who entered the input address has made a typo for the actual delivery address, which includes "North Broadway Street". A first equal candidate address string may include "North Broadway Street", while a second equal candidate address string may include "East Broodway Street". Ignoring the other portions of each string for sake of simplification, in comparing the input address string with the first equal candidate address string, the server 410 may first remove the words "North" and "Street" from the input address string and the first equal candidate address string. An aggregate edit distance of "one" may be determined between the remaining strings "Broodway" and "Broadway". When the server 410 compares the input address string with the second equal candidate address string, the server 410 may remove the words "Broodway" and "Street" from the input address string and the second equal candidate address string. The server 410 may subsequently determine that the aggregate edit distance between the remaining strings, "North" and "East" may be greater than one. Therefore, the first equal candidate address string may be determined to have a higher matching degree to the input address string than the second equal candidate address string, at least with respect to the aggregate edit distance.

Determining whether any word in each equal candidate address string of the subset is a prefix of a corresponding word in the input address string (and vice versa) may involve the following. The server 410 may store in the memory 414, knowledge of words that are prefixes of other words. For example, "E" may be a known prefix of "East" (in addition to being an abbreviation). A prefix relationship between two words may be observed when two elements are not equal, but one element starts with the other element. Therefore, determining whether any word in an equal candidate address string of the subset is a prefix of a corresponding word in the input address string (and vice versa) may involve determining the number of prefix relationships present between the equal candidate address and the input address string. An equal candidate address string determined to have more prefix relationships with the input address string than other equal candidate address strings, may be determined to have a higher matching degree to the input address string than the others, at least with respect to prefixes.

In some embodiments, the results yielded from one or more of the subprocesses may be used together to identify one candidate address, out of the two or more equal candidate addresses, which has the highest matching degree. Accordingly, the one candidate address having the highest matching degree may be a candidate address that meets one or more of the following criteria: a highest degree to which the order of words in the candidate address is the same as a corresponding order of words in the input address; a lowest number of unmatching words between the candidate address and the input address; a lowest aggregate edit distance; or a highest number of words of the candidate address being prefixes of corresponding words in the input or vice versa. The one candidate address having the highest matching degree may therefore be designated as the reference address.

The process of identifying the reference address from the 10 candidate address may therefore essentially be re-ranking the 10 candidate addresses, which were first ranked by the engine 420, according to rules specific to postal address searching which are implemented by the server 410. The candidate address with the highest rank after the re-ranking may be chosen as the reference address.

Figure 7:
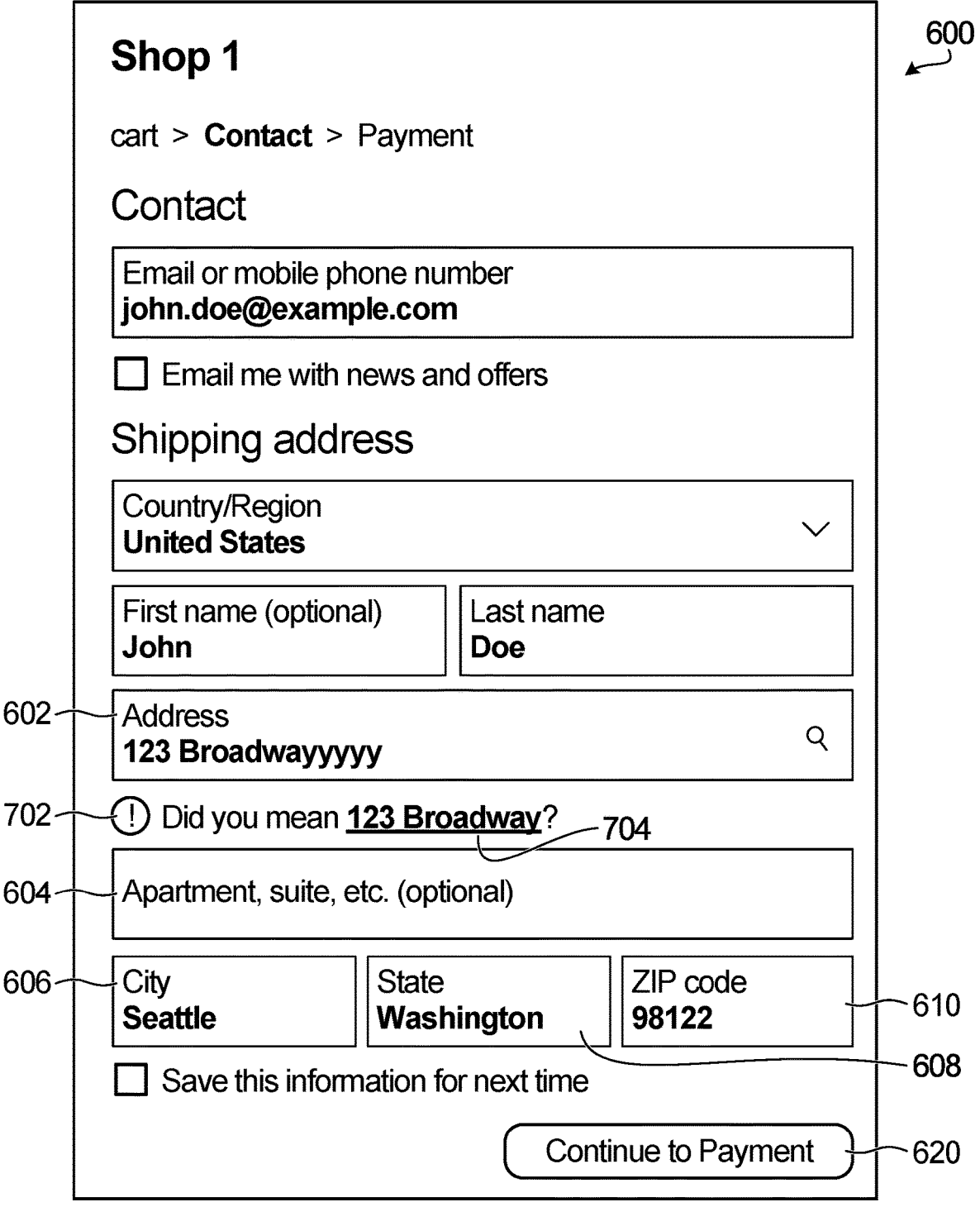
FIGS. 7, 8A, and 8B illustrate the checkout page of FIG. 6, showing other correction suggestions, according to some embodiments.
Figure 8A:
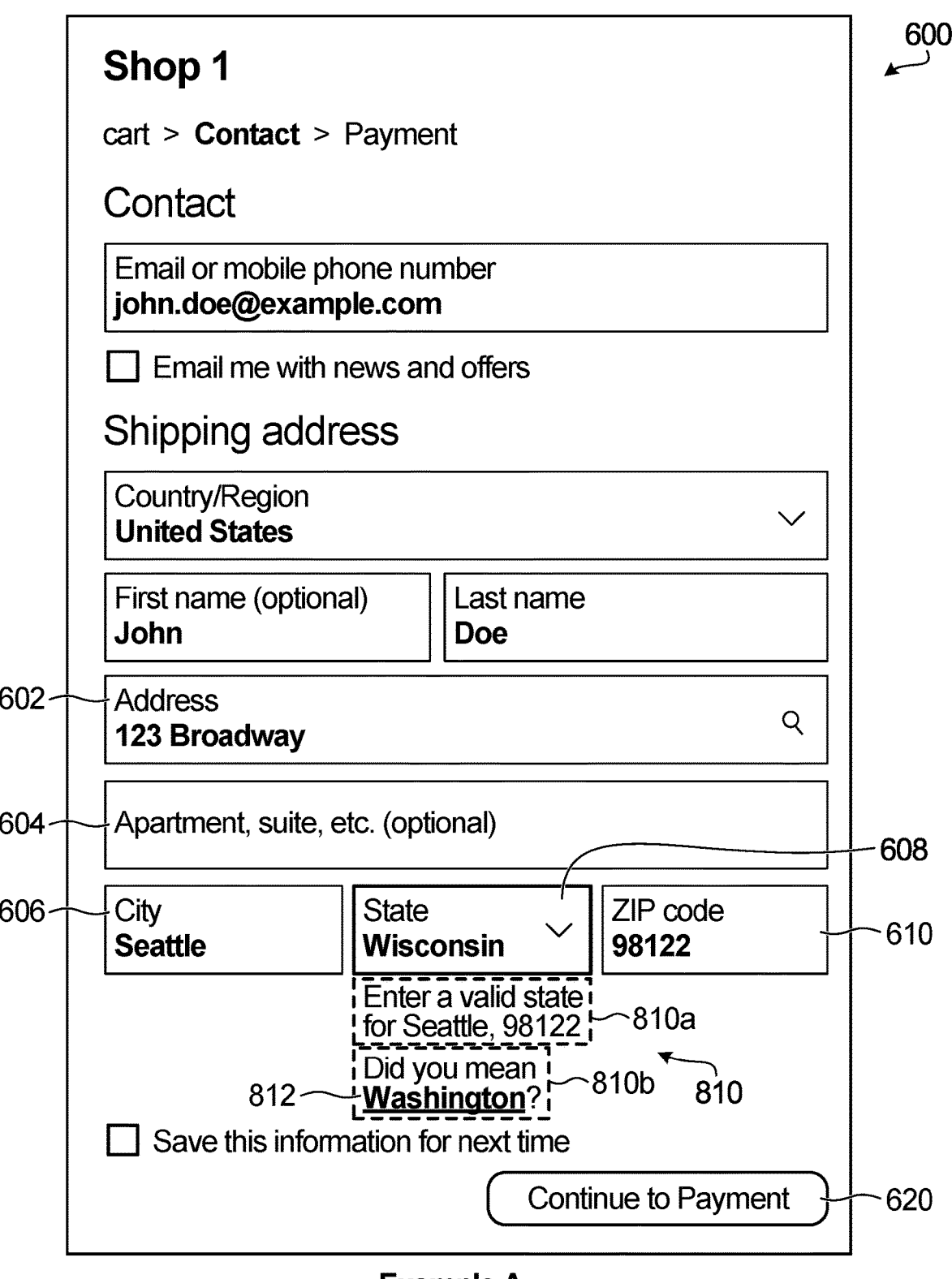
Figure 8B:
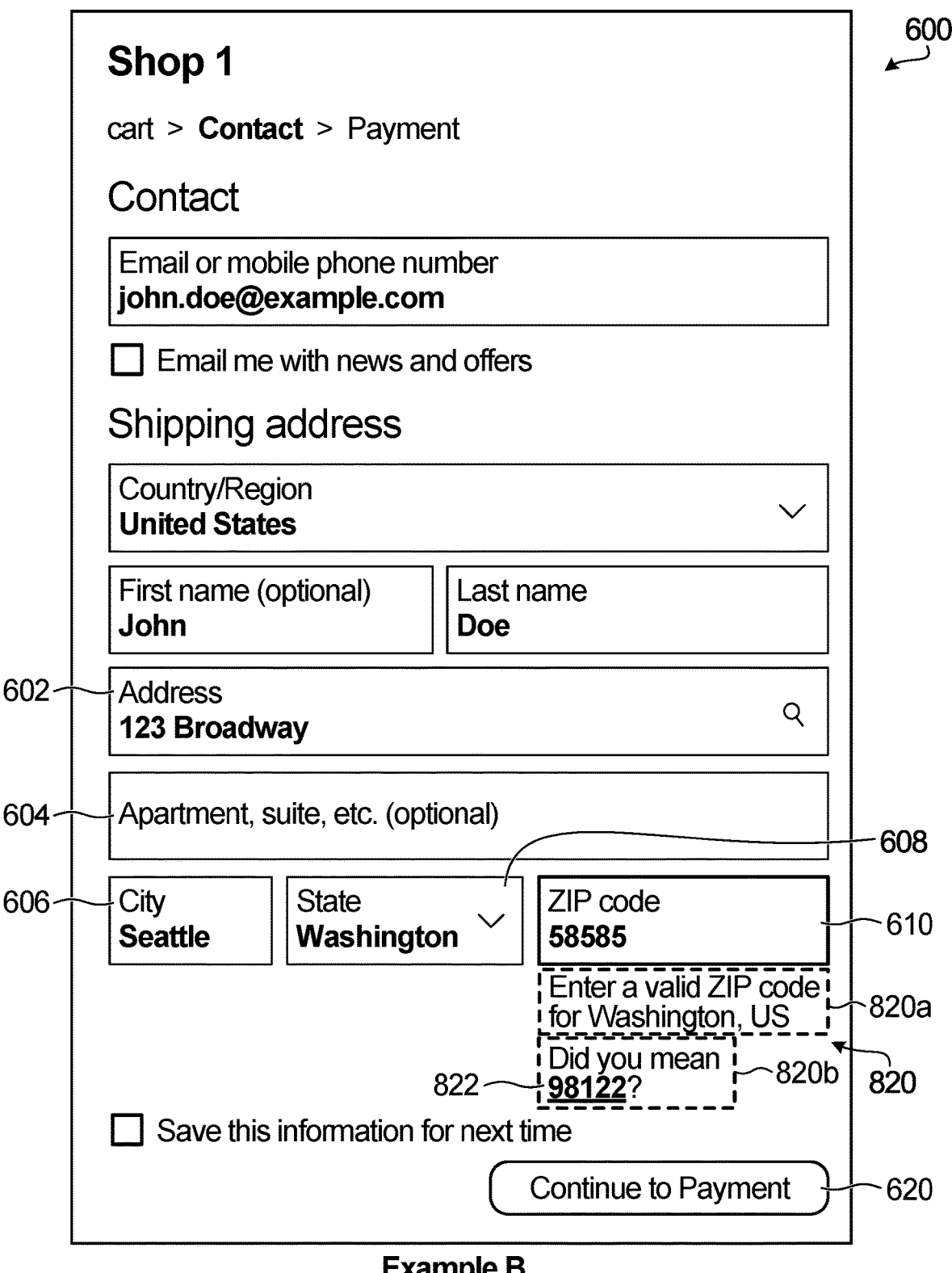

Returning to FIG. 5, at step 506, the processor 412 of the address validation and correction server 410 may compare the input address to the identified reference address to identify an address component of the input address that is different from a respective component of the reference address. For example, FIGS. 6-8 show example illustrations of input addresses entered by a user. A "true" delivery address of the user, i.e., the actual address of the user, may be "123 Broadway, Seattle, Washington, 98122". In each of the FIGS. 6, 7, 8A and 8B, the user has made an error in entering their actual address. In FIG. 6, the user has failed to type in the full word, "Seattle" in the city address field 606. In FIG. 7, the user has made typos in the first address field 602. In FIG. 8A, the user has entered the wrong state in the state address field 608. In FIG. 8B, the user has entered the wrong zip code in the zip code address field 610.

Following the processes outlined above for identifying the reference address, the processor 412 may identify "123 Broadway, Seattle, Washington, 98122" as being the reference address. In each example instance shown in FIGS. 6-8, the processor 412 may compare the reference address with the input address entered by the user to determine an address component of the input address that is different from a respective component of the reference address. For example, with respect to the embodiment shown in FIG. 6, the processor 412 may identify "Seat" as an address component of the input address that is different from the respective component of "Seattle" of the reference address.

Returning to FIG. 5, at step 508, the processor 412 may transmit, to the user device, an instruction to display the respective component of the reference address as an alternative to the address component of the input address. In some embodiments, the respective component of the reference address may be displayed adjacent to the address field including the different component. In some embodiments, the respective component of the reference address may be displayed as a selectable user interface element.

For example, referring again to FIG. 6, a correction suggestion phrase 612 is displayed for the user on the user interface 436 of the user device 430. The correction suggestion phrase 612 may display the respective component of "Seattle" as a suggested alternative to the "Seat" component entered by the user. The respective component of "Seattle" may be displayed as a selectable user interface element 614. The correction suggestion phrase 612 may be displayed adjacent to the city address field 606. In some embodiments, the correction suggestion phrase 612 may be displayed adjacent to the city address field 606 on the same checkout page 600, although this is not necessary. For example, in some embodiments, the correction suggestion phrase 612 may instead be displayed in a different window or page.

Referring to FIG. 7, the server 410 may determine the street component of "Broadwayyyyy" of the input address as different to the respective component of "Broadway" of the reference address. Therefore, a correction suggestion phrase 702 may be displayed for the user on the user interface 436 of the user device 430, the correction suggestion phrase 702 displaying the respective component "Broadway" as a suggested alternative to the "Broadwayyyyy" component entered by the user. The respective component of "Broadway" may be displayed as a selectable user interface element 704. In some embodiment, the entire portion which includes the respective component, may be displayed as the selectable user interface element, as shown.

Referring to FIGS. 8A and 8B, in FIG. 8A the server 410 may determine the state component of "Wisconsin" of the input address as different to the respective component of "Washington" of the reference address. In FIG. 8B, the server 410 may determine the zip code component of "58585" as different to the respective component of "98122" of the reference address. Therefore in the embodiments illustrated in FIGS. 8A and 8B, correction suggestion phrases 810 and 820 may be displayed on the user interface 436 of the user device 430, respectively. The correction suggestion phrase 810 may include the respective component of "Washington" as a selectable user interface element 812, while the correction suggestion phrase 820 may include respective component of "98122" as a selectable user interface element 822.

The processes described above, with respect to identifying a reference address, comparing the input address to the reference address, transmitting an instruction to display an address component of the input address identified to be different from a respective component of the reference address as an alternative to the address component, and displaying a correction suggestion phrase including the respective component of the reference address as an alternative to the address component, may be performed by the system 400 in real time or near real time. This is important in the context of web navigation in which there needs to be a small amount of time between when the user enters the input address and when any suggested correction to the address is transmitted for display on the page.

In some embodiments, the user may select the selectable user interface element, such as selectable user interface element 614, 704, 812, or 822. For example, with respect to FIG. 6, the user may agree that the user-entered input address should be altered to include "Seattle" instead of "Seat". The processor 412 may, in response to receiving the input of the user selecting the selectable user interface element 614, cause modification of the checkout page 600. The modification of the checkout page 600 may include removal of the display of the correction suggestion phrase 612, and the replacement of the component "Seat" in the city address field 606 with the respective component of the reference address, i.e., "Seattle". Similarly, with respect to FIG. 7, the user may select the selectable user interface element 704. In response, the processor 412 may cause modification of the checkout page 600 to remove the display of the correction suggestion phrase 702, and replace the component "Broadwayyyyy" with "Broadway".

In some embodiments, the correction suggestion phrase may be ignored or disregarded by the user without consequence. For example, in FIG. 6, the system 400 may view the component "Seat" as an error since the component "Seat" is different to the respective component "Seattle" of the reference address. The system 400 may thus display the correction suggestion phrase 612 to suggest that "Seat" be replaced with "Seattle". The correction suggestion phrase 612 may be ignorable in that even if the user decides, for whatever reason, to not select the selectable user interface element 614 to replace "Seat" with "Seattle", the user can subsequently select the user interface element 620 to proceed further with the order. In other words, despite the user not selecting element 614, the system 400 may cause the order to proceed upon the user selecting the element 620. This may be possible because the system 400 may view the error as an insignificant error. An insignificant error may be one which, from the perspective of the system 400, is unlikely to cause issues related to delays in delivery or failures in delivery. For example, even if the "Seat" component in FIG. 6 was not replaced with "Seattle", the system 400 may view this error as one that can be resolved by delivery personnel or one that will not delay delivery, e.g. because the zip code is correct and consistent with the state, such that the city is somewhat redundant.

As previously mentioned, in some situations, selecting the element 620 may result in the order not proceeding further, if the selectable element of the correction suggestion phrase is not first selected. One instance where this may occur is when there is a significant error in the information entered by the user in one or more of the required address fields 602, 606, 608, 610. A significant error may describe an error that may cause delay or failure of delivery. If the system 400 were to allow the order to further proceed with the input address having the significant error, it may be difficult for delivery or courier personnel to resolve the error when attempting to deliver a package addressed to the input address.

In some embodiments, a significant error may arise if there is an inconsistency between the city portion in the city address field 606, the state portion in the state address field 608, and the zip code portion in the zip code address field 610 of the input address. Examples of this are illustrated in FIGS. 8A and 8B. In FIG. 8A, the user is presented with the correction suggestion phrase 810. The correction suggestion phrase 810 includes a warning element 810a, and a suggestion element 810b. The warning element 810a may include phrasing that communicates to the user that a component must be changed in the input address, such as "Enter a valid state for Seattle, 98122". In FIG. 8B, the user is presented with the correction suggestion phrase 820. The correction suggestion phrase 820 includes a warning element 820a, and a suggestion element 820b. The warning element 820a may include phrasing that communicates to the user that a component must be changed in the input address, such as "Enter a valid zip code for Seattle, Washington" or "Enter a valid zip code for Washington, US". The presence of a warning element such as warning element 810a, may be an indication that the user may be unable to proceed further with the order unless the component is replaced with a suitable alternative, such as the alternative presented as selectable element 812. In such embodiments, if the user decides to disregard the correction suggestion phrase 810 or 820 and not select the selectable element 812 or 822, the system 400 may block the user from being to proceed further in the order, even if the user selects the element 620. Instead, the user may be presented with an error message, and/or may find that the element 620 is not actually selectable, and/or find that the checkout page 600 is unchanged, which may communicate to the user that the correction suggestion phrase 810 or 820 must be addressed.

In embodiments where the input address is determined by the system 400 to include a significant error, the correction suggestion phrase may be displayed in such a manner to easily capture the attention of the user. For example, in FIG. 8A, although not explicitly shown the correction suggestion phrase 810 may be displayed in a red font, and/or a bolded font, and/or a larger font as compared to other words on the checkout page 600.

Figure 9:
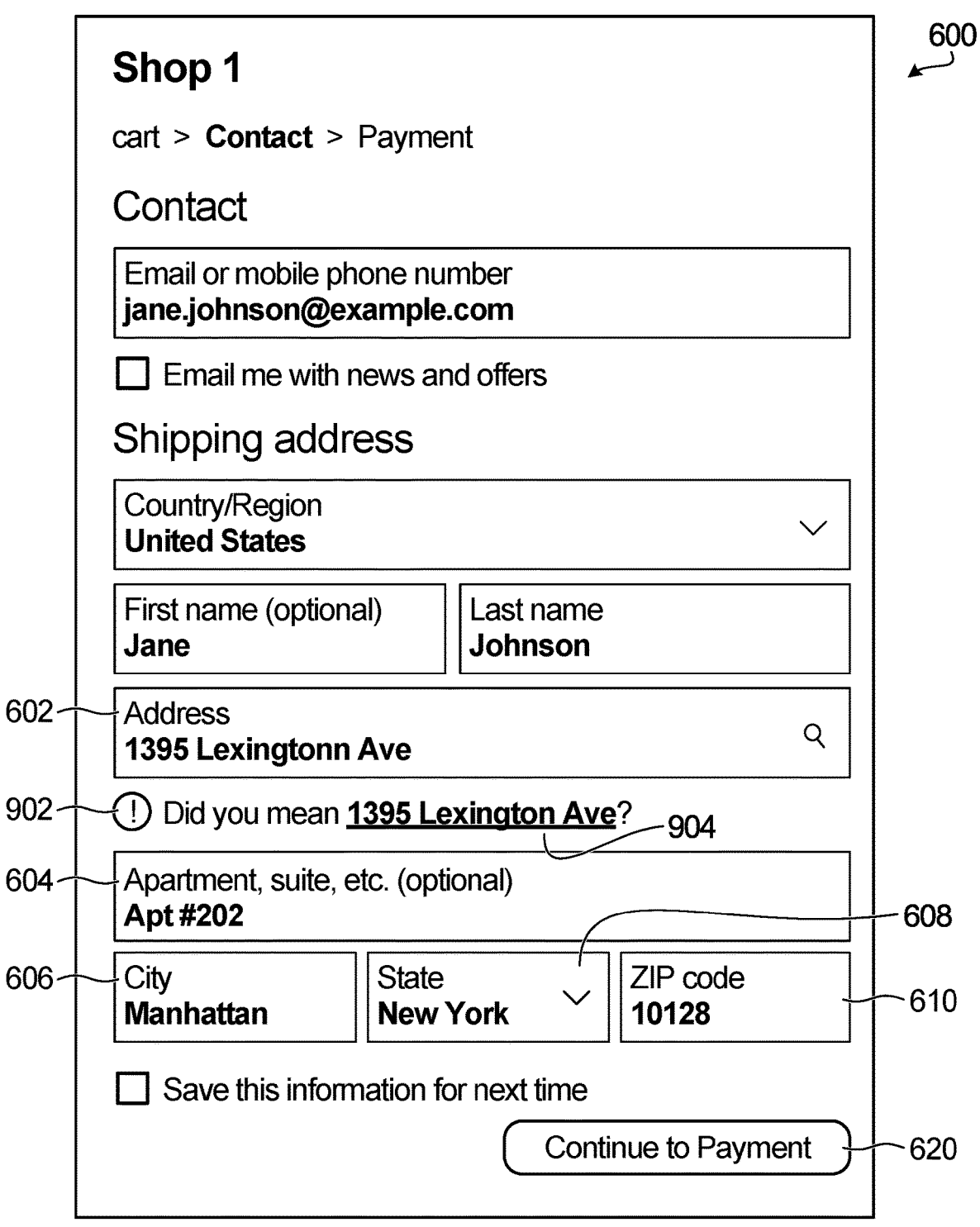
FIG. 9 illustrates a checkout page having another user's delivery address filled in fields, the checkout page showing a correction suggestion for the delivery address, according to some embodiments.

In some embodiments, for any one component of the input address identified as being different from a respective component of a reference address, the processor 412 may only transmit an instruction to display the respective component of the reference address as an alternative to the input address component if the difference between the component and the respective component is determined to be a meaningful difference. For example, FIG. 9 illustrates the plurality of address fields of checkout page 600 filled in by a different user. The reference address, identified by the processes outlined above, may be, "1395 Lexington Avenue, Suite 202, New York, NY, 10128". In other words, the reference address was identified by the processor 412 as the address, from the address database 428, which is most likely to be the user's "true" or actual delivery address. The processor 412 may determine several components of the input address that are different to respective components of the reference address. For example, as shown, the street component "Lexingtonn Avenue" of the input address is different to "Lexington Avenue" of the reference address, the second address component "Apt #202" of the input address is different to "Suite 202" of the reference address, and the city component "Manhattan" of the input address is different to "New York" of the reference address. However, as illustrated in FIG. 9, there may only be a correction suggestion phrase 902 with respect to the street component "Lexingtonn Avenue".

This may be because the processor 412 views the differences between the second address component and the city component of the input address, and the respective components of the reference addresses, as unmeaningful. By contrast, the processor 412 may view the difference between the street component of the input address and the respective component of the reference address as meaningful. Determining whether or not a difference between a component of an input address and a respective component of the reference address is meaningful or not, may involve determining whether the difference can be attributed to one being an abbreviation, acronym, synonym, accented/unaccented version, prefix, etc. of the other. Specifically, the processor 412 may leverage the knowledge the system 400 possesses about abbreviations, acronyms, synonyms, accents, prefixes, etc., to determine whether the difference can be attributed to one of these. If the difference is indeed attributable to one of such known factors, the difference may be determined to be unmeaningful. If the difference is not attributable to any of the known factors, the difference may be determined to be meaningful. In this way, a meaningful difference may be one that improves, or is likely to improve, deliverability when implemented as a change to the input address.

With respect to the embodiment shown in FIG. 9, the difference between the street component "Lexingtonn Avenue" of the input address and the respective component "Lexington Avenue" of the reference address may be determined to be meaningful. By contrast, the terms "Apt #" or "Apartment" may be known synonyms to "Suite", and the city "Manhattan" may be a known synonym of "New York". These differences may be determined to not be meaningful. Although the address database 428 may consider an input term, such as "Manhattan", to be an invalid or incorrect element for an address (e.g., an address located in the city of Manhattan may be properly listed with "New York" as the city name), the server 410 may nevertheless recognize "Manhattan" to be a synonym of "New York" as a city name, and view this difference to not be meaningful. Therefore, the processor 412 may only transmit an instruction to display the respective city component "Lexington Avenue" as an alternative to the street component "Lexingtonn Avenue", and not send instructions with respect to the others. If it is determined that there are meaningful differences between multiple components of the input address and respective components of a reference address, the processor 412 may transmit instructions corresponding to the number of identified differences.

From the user's perspective, the user may have made a typo when entering information for the first address field 602. However, the user may believe that the components "Apt #202" and "Manhattan" are accurate components of their actual or "true" delivery address. Being shown a correction suggestion phrase 902 with selectable element 904, only with respect to the field the user made a typo in, instead of additionally being shown correction suggestion phrases with respect to "Apt #202" and "Manhattan", may provide a less jarring user experience. Also, just the portion of the address that needs correction (because it is a meaningful difference) is flagged, with a corresponding correction suggestion phrase 902 being displayed, rather than suggesting replacement of the address as a whole (e.g. via a modal window). This allows the user to select replacement of just that address component, rather than having to select replacement of the whole address, which provides for improved user-machine interaction. Notably, the user is not forced to correct other address components that are equivalent to but not exactly equal to that of the reference address, e.g. the user is not forced to replace the whole address where "Apt #202" and "Manhattan" are replaced with "Suite 202" and "New York".

CONCLUSION

Note that the expression "at least one of A or B", as used herein, is interchangeable with the expression "A and/or B". It refers to a list in which you may select A or B or both A and B. Similarly, "at least one of A, B, or C", as used herein, is interchangeable with "A and/or B and/or C" or "A, B, and/or C". It refers to a list in which you may select: A or B or C, or both A and B, or both A and C, or both B and C, or all of A, B and C. The same principle applies for longer lists having a same format.

Although the present invention has been described with reference to specific features and embodiments thereof, various modifications and combinations may be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions, and alterations may be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor-readable storage medium or media for storage of information, such as computer/processor-readable instructions, data structures, program modules, and/or other data. A non-exhaustive list of examples of non-transitory computer/processor-readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor-readable storage media.

Memory, as used herein, may refer to memory that is persistent (e.g. read-only-memory (ROM) or a disk), or memory that is volatile (e.g. random access memory (RAM)). The memory may be distributed, e.g. a same memory may be distributed over one or more servers or locations.

The invention claimed is:

1. A computer-implemented method comprising:

transmitting, to a user device, web content corresponding to a page for placing an order, the web content including instructions for rendering address fields on the page for receiving an input address;

receiving, from the user device, the input address that was provided via the address fields of the page, the input address containing a plurality of address components, each one of the address components provided via a respective address field of the page;

identifying a plurality of candidate addresses from all addresses in an address database, the identification comprising:

assigning a score to each address in the address database based on a number of address components of each address that are deemed to be equivalent to respective address components of the input address;

determining the plurality of candidate addresses based on the assigned scores, wherein each of the plurality of candidate addresses has a score that is greater than respective scores of other addresses in the address database;

determining a reference address from the plurality of candidate addresses, wherein the reference address includes the greatest number of address portions determined to match respective portions of the input address;

comparing the input address to the reference address to identify a difference between an address component of the input address and a respective component of the reference address;

determining whether the identified difference is meaningful or unmeaningful, the determination comprising evaluating whether the identified difference can be attributed to one of the address component of the input address and the respective component of the reference address being an abbreviation, acronym, synonym, prefix, or accented version of the other of the address component of the input address and the respective component of the reference address; and responsive only to determining that the identified difference is meaningful, transmitting, to the user device, an instruction to display the respective component of the reference address as an alternative to the address component of the input address.

2. The computer-implemented method of claim 1, wherein the instruction to display the respective component of the reference address as an alternative to the address component of the input address comprises an instruction to display the respective component adjacent to an address field containing the address component of the input address.

3. The computer-implemented method of claim 1, wherein the respective component of the reference address in the address database is instructed to be displayed as a selectable user interface element.

4. The computer-implemented method of claim 3, wherein the computer-implemented method further comprises:

receiving an input selecting the selectable user interface element; and responsive to receiving the input, causing modification of the page to remove the display of the respective component of the reference address adjacent to the address field, and replace the address component that is different from the respective address component with the respective address component in the address field.

5. The computer-implemented method of claim 3, further comprising:

receiving an input selecting a different user interface element different from the selectable user interface element, the input defining an operation related to a request to proceed with the order;

responsive to receiving the input, causing the order to proceed even if the selectable user interface element is not selected.

6. The computer-implemented method of claim 3, further comprising:

receiving an input selecting a different user interface element different from the selectable user interface element, the input defining an operation related to a request to proceed with the order;

responsive to receiving the input, causing modification of the page to display an error message, thereby not allowing the placing of the order to proceed if the selectable user interface element is not selected.

7. The computer-implemented method of claim 1, further comprising:

responsive to receiving the input address that was provided via the address fields of the page, selecting the plurality of candidate addresses from all addresses in the address database, wherein:

each of the plurality of candidate addresses includes one or more address components deemed to be equivalent to respective one or more of the plurality of address components of the input address; and wherein each of the plurality of candidate addresses is determined to include a greater number of address components deemed to be equivalent to the plurality of address components of the input address than other addresses in the address database.

8. The computer-implemented method of claim 1, wherein each of the plurality of candidate addresses is divisible into a respective set of address portions, the address portions each consisting of one or more address components, and wherein determining the reference address comprises:

for each of the plurality of candidate addresses, comparing each address portion to a respective address portion of the input address to determine if the address portion and the respective address portion match; and designating, as the reference address, one of the plurality of candidate addresses including the greatest number of address portions determined to match respective portions of the input address.

9. The computer-implemented method of claim 8, wherein the comparing each address portion to the respective address portion of the input address to determine if the address portion and the respective address portion match comprises determining whether the address portion is equivalent to the respective address portion, and wherein the address portion and the respective address portion are determined to match if the address portion is equivalent to the respective portion.

10. The computer-implemented method of claim 8, further comprising:

responsive to determining that there is a subset of the plurality of candidate addresses that each include the greatest number of address portions determined to match respective address portions of the input address, comparing each candidate address of the subset as a whole to the input address as a whole to determine a matching degree; and designating, as the reference address, the candidate address of the subset having the highest matching degree.

11. The computer-implemented method of claim 10, wherein comparing each candidate address of the subset as a whole to the input address as a whole to determine a matching degree comprises at least one of:

determining a degree to which an order of words in each candidate address of the subset is the same as a corresponding order of words in the input address;

determining a number of unmatching words between each candidate address of the subset and the input address;

determining an aggregate edit distance between each candidate address of the subset and the input address; or determining a number of prefix relationships between each candidate address of the subset and the input address.

12. The computer-implemented method of claim 11, wherein the candidate address of the subset having the highest matching degree includes at least one of:

a highest degree to which the order of words in the candidate address is the same as a corresponding order of words in the input address;

a lowest number of unmatching words between the candidate address and the input address;

a lowest aggregate edit distance; or a highest number of prefix relationships between the candidate address and the input address.

13. A system comprising:

at least one processor; and a memory storing processor-executable instructions that, when executed, cause the at least one processor to:

transmit, to a user device, web content corresponding to a page for placing an order, the web content including instructions for rendering address fields on the page for receiving an input address;

receive, from the user device, the input address that was provided via the address fields of the page, the input address containing a plurality of address components, each one of the address components provided via a respective address field of the page;

identify a plurality of candidate addresses from all addresses in an address database, the identification comprising:

assigning a score to each address in the address database based on a number of address components of each address that are deemed to be equivalent to respective address components of the input address;

determining the plurality of candidate addresses based on the assigned scores, wherein each of the plurality of candidate addresses has a score that is greater than respective scores of other addresses in the address database;

determine a reference address from the plurality of candidate addresses, wherein the reference address includes the greatest number of address portions determined to match respective portions of the input address;

compare the input address to the reference address to identify a difference between an address component of the input address and a respective component of the reference address;

determine whether the identified difference is meaningful or unmeaningful, the determination comprising evaluating whether the identified difference can be attributed to one of the address component of the input address and the respective component of the reference address being an abbreviation, acronym, synonym, prefix, or accented version of the other of the address component of the input address and the respective component of the reference address; and responsive only to determining that the identified difference is meaningful, transmit, to the user device, an instruction to display the respective component of the reference address as an alternative to the address component of the input address.

14. The system of claim 13, wherein the instruction to display the respective component of the reference address as an alternative to the address component of the input address comprises an instruction to display the respective component adjacent to an address field containing the address component of the input address.

15. The system of claim 13, wherein the respective component of the reference address in the address database is instructed to be displayed as a selectable user interface element.

16. The system of claim 15, wherein the at least one processor is further to:

receive an input selecting the selectable user interface element; and responsive to receiving the input, cause modification of the page to remove the display of the respective component of the reference address adjacent to the address field, and replace the address component that is different from the respective address component with the respective address component in the address field.

17. The system of claim 13, wherein the at least one processor is further to:

responsive to receiving the input address that was provided via the address fields of the page, select the plurality of candidate addresses from all addresses in the address database, wherein:

each of the plurality of candidate addresses includes one or more address components deemed to be equivalent to respective one or more of the plurality of address components of the input address; and wherein each of the plurality of candidate addresses is determined to include a greater number of address components deemed to be equivalent to the plurality of address components of the input address than other addresses in the address database.

18. The system of claim 13, wherein each of the plurality of candidate addresses is divisible into a respective set of address portions, the address portions each consisting of one or more address components, and wherein the at least one processor is further to determine the reference address by performing operations including:

for each of the plurality of candidate addresses, comparing each address portion to a respective address portion of the input address to determine if the address portion and the respective address portion match; and designating, as the reference address, one of the plurality of candidate addresses including the greatest number of address portions determined to match respective portions of the input address.

19. The system of claim 18, wherein the at least one processor is further to:

responsive to determining that there is a subset of the plurality of candidate addresses that each include the greatest number of address portions determined to match respective address portions of the input address, compare each candidate address of the subset as a whole to the input address as a whole to determine a matching degree; and designate, as the reference address, the candidate address of the subset having the highest matching degree.

20. A non-transitory computer readable medium having stored thereon computer-executable instructions that, when executed by a computer, cause the computer to perform operations comprising:

transmitting, to a user device, web content corresponding to a page for placing an order, the web content including instructions for rendering address fields on the page for receiving an input address;

receiving, from the user device, the input address that was provided via the address fields of the page, the input address containing a plurality of address components, each one of the address components provided via a respective address field of the page;

identifying a plurality of candidate addresses from all addresses in an address database, the identification comprising:

assigning a score to each address in the address database based on a number of address components of each address that are deemed to be equivalent to respective address components of the input address;

determining the plurality of candidate addresses based on the assigned scores, wherein each of the plurality of candidate addresses has a score that is greater than respective scores of other addresses in the address database;

determining a reference address from the plurality of candidate addresses, wherein the reference address includes the greatest number of address portions determined to match respective portions of the input address;

comparing the input address to the reference address to identify a difference between an address component of the input address and a respective component of the reference address;

determining whether the identified difference is meaningful or unmeaningful, the determination comprising evaluating whether the identified difference can be attributed to one of the address component of the input address and the respective component of the reference address being an abbreviation, acronym, synonym, prefix, or accented version of the other of the address component of the input address and the respective component of the reference address; and responsive only to determining that the identified difference is meaningful, transmitting, to the user device, an instruction to display the respective component of the reference address as an alternative to the address component of the input address.

\* \* \* \* \*